United States Patent Office 3,300,495
Patented Jan. 24, 1967

3,300,495
4 - CARBOXYALKYLMERCAPTO-5-ARYL PYRIMIDINES AND METHOD OF PREPARING SAME
Zdenek Perina, Viktor Bydzovsky, Zdenek Budesinsky, and Jaroslav Sluka, all of Prague, Czechoslovakia, assignors to Spofa Sdružení podniků pro zdravotnickou výrobu, Prague, Czechoslovakia
No Drawing. Filed Dec. 26, 1963, Ser. No. 333,644
Claims priority, application Czechoslovakia, Jan. 3, 1963, 17/63
12 Claims. (Cl. 260—251)

The invention relates to new 4-carboxyalkylmercapto-5-aryl pyrimidines of general Formula I, and to the method of preparing same. The Formula I is:

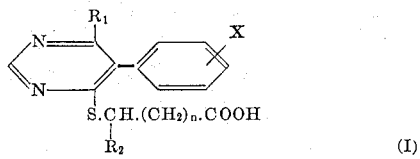

wherein the substituents $R_1$ and $R_2$, either identical or different, stand for hydrogen, straight or branched alkyl with 1–4 carbon atoms, the substituent X, in any position of the benzene nucleus, signifies a hydrogen or halogen atom, amino group or nitro group, respectively, and $n$ signifies a number from 0 to 5.

It was found that the new substances of the general Formula I are effective chemotherapeutics for treating some virus infections. A significant effect has been shown especially in experimental infection of white mice with virus of influenza pneumonia APR 8. The acute and chronic toxicity of said substances is very low; another advantage thereof is the fact that they can be applied both in peroral and parental administration, since they yield well soluble neutral salts with alkali metal.

According to the invention, the new substances of the general Formula I are prepared in the manner that compounds if general Formula II:

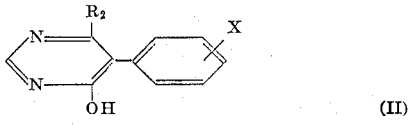

are sulfidized to form compounds of the general Formula III:

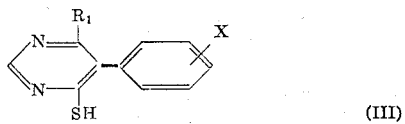

that by reaction with halogen carboxylic acids, or with the salts or esters thereof, respectively, are converted to compounds of the general Formula I.

The sulfidization of the compounds of the general Formula II is preferably carried out by means of phosphorous pentasulfide in the medium of anhydrous inert organic solvents, such as pyridine, tetraline, or methyl naphthalane, at temperature of 80–200° C.

In the subsequent step the reaction of compounds of the general Formula III with carboxylic acid halides, or salts and esters thereof, respectively, is preferably carried out in the medium of an aqueous or aqueous-alcoholic solution of an alkali metal hydroxide.

In performing the method according to the invention, the proceeding is as a rule of that sort that the starting compound of the general Formula II is heated with excess phosphorus pentasulfide to the necessary temperature given by the character of the solvent just serving as the medium, e.g. to the temperature of the boiling point of the reaction mixture. Compounds of the general Formula III thus obtained are reacted, either isolated or without being isolated, with the respective carboxylic acid halide, or the salt or ester thereof, respectively. This second reaction step proceeds to the best advantage in an aqueous-alcoholic medium, in the presence of alkali-metal hydroxides.

In the case that the reaction is carried out with an ester of the carboxylic acid halide, there results the alkylester of the corresponding 4-carboxylalkylmercapto-5-aryl pyrimidine, which is as a rule in the form of an oil that is then saponified without being isolated by standing with a solution of an alkali metal hydroxide. The desired product is eliminated by acidification of the reaction mixture. The new substances of the general Formula I in the form of free acids are generally but slightly water-soluble, yielding however very easily soluble salts with alkali metals.

The following examples serve for illustration of the method without any limitation to them.

EXAMPLES (1) *4-carboxymethylmercapto-5-phenyl pyrimidine*

17.2 g. 4-hydroxy-5-phenyl pyrimidine and 50 g. phosphorus pentasulfide in 200 ml. anhydrous pyridine are heated for 2 hours to the boil under reflux. The excess pyridine is the distilled off in vacuo, and the residue is decomposed with water. The product eliminated is sucked off and recrystallized from water. There is obtained 8.0 g. of 4-mercapto-5-phenyl pyrimidine, having M.P. 168–169° C. (subl.). 5.65 g. of this substance is dissolved in 60 ml. of 65%-ethanol. The solution obtained is cooled to −5° C., and at this temperature 4.05 g. ethyl chloroacetate is dropwise added under stirring. By standing an oil is eliminated, whereat the solution assumes neutral reaction. The reaction mixture is then evaporated to about ⅓ volume, 40 ml. of 10%-sodium hydroxide is added, and there is stirred for 8 hours at a temperature of 40–50° C. The solution is then decolorized with active charcoal, filtered, and the filtrate acidified with acetic acid to pH 4–5. The product eliminated crystallizes during a few minutes, so that it can be sucked off and washed. By recrystallization from 40%-ethanol 4.7 g. of the pure product with M.P. 203–205° C. (decomp.) is obtained.

(2) *4-(4-carboxybutylmercapto)-5-(4-chlorophenyl) pyrimidine*

5.91 g. of 4-mercapto-5-(4-chlorphenyl) pyrimidine with M.P. 245° C., prepared of 4-hydroxy-5-(4-chlorophenyl) pyrimidine analogically to Example 1, and 6.1 g. of ethyl δ-bromovalerate are boiled for 2 hours under reflux in a solution of 1.17 g. sodium hydroxide in a mixture of 40 ml. ethanol and 20 ml. water. The solution obtained is then evaporated in vacuo to about 20 ml., whereupon the eliminated oily product is saponified by standing with a solution of 3.5 g. sodium hydroxide in 20 ml. water. By acidification of the sodium salt with acetic acid, the above defined product is eliminated, which is sucked off, washed and then recrystallized from 30%-ethanol. Yield is 3.5 g. of the substance with M.P. 126° C.

(3) *4-(1-carboxyethylmercapto)-5-(2-chlorophenyl) pyrimidine*

From 4-hydroxy-5-(2-chlorophenyl)pyrimidine, by a process analogous to that of Example 1, the 4-mercapto-5-(2-chlorophenyl)pyrimidine with M.P. 246° C. (decomp.) is prepared. 6.7 g. of this substance is converted in the same manner as in Example 1, by reacting it with 5.97 g. ethyl α-bromopropionate, to the final product 4 - (1 - carboxyethylmercapto) - 5 - (2 - chlorophenyl) pyrimidine with M.P. 183° C. (decomp.).

(4) *4-(4-carboxybutylmercapto)-5-phenyl-6-methyl pyrimidine*

Of 4.3 g. 4-mercapto-5-phenyl-6-methyl pyrimidine, having M.P. 180° C. and prepared by reacting 4-hydroxy-5-phenyl-6-methyl pyrimidine with phosphorus pentasulfide according to Example 1, there is obtained by reaction with ethyl δ-bromovalerate, according to Example 2, the above defined produce, having M.P. 109–110° C.

We claim:

1. The compound of the formula

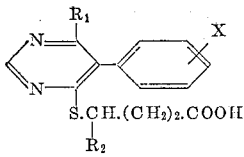

wherein $R_1$ and $R_2$ each are selected from the group consisting of a hydrogen atom, straight alkyl with 1–4 carbon atoms and branched alkyl with 1–4 carbon atoms, X is selected from the group consisting of a hydrogen atom, a halogen atom, the amino group and the nitro group, and $n$ denotes an integral number from 0 to 5.

2. A compound as defined in claim 1, wherein $R_1$ and $R_2$ are identical.

3. A compound as defined in claim 1, wherein $R_1$ and $R_2$ are different from each other.

4. 4-carboxymethylmercapto-5-phenyl)pyrimidine.

5. 4 - (4 - carboxybutylmercapto) - 5 - (4 - chlorophenyl) pyrimidine.

6. 4 - (1 - carboxyethylmercapto) - 5 - (2 - chlorophenyl) pyrimidine.

7. 4 - (4 - carboxybutylmercapto) - 5 - phenyl - 6 - methyl pyrimidine.

8. The method of preparing 4-carboxyalkylmercapto-5-aryl pyrimidines of the general formula

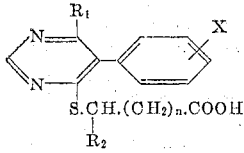

wherein $R_1$ and $R_2$ each are selected from the group consisting of a hydrogen atom, straight alkyl with 1–4 carbon atoms and branched alkyl with 1–4 carbon atoms, X is selected from the group consisting of a hydrogen atom, a halogen atom, the amino group and the nitro group, and $n$ denotes an integral number from 0 to 5, comprising the steps of reacting a compound of the general formula

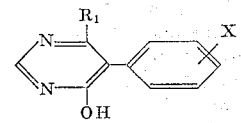

wherein $R_1$ and X have the same meaning as above, with phosphorus pentasulfide so as to form a compound of the general formula

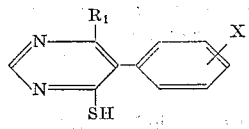

wherein $R_1$ and X have the same meaning as above; reacting said last mentioned compound with a substance selected from the group consisting of halogen-carboxylic acids of the general formula:

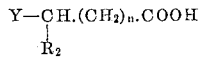

wherein $R_2$ is selected from the group consisting of a hydrogen atom, straight alkyl with 1–5 carbon atoms and branched alkyl with 1–5 carbon atoms and Y is a halogen and $n$ denotes an integral number from 0 to 5, and salts and esters thereof; and saponifying the thus formed compound.

9. A method according to claim 8, wherein said reacting with phosphorus pentasulfide is carried out in the medium of an anhydrous inert organic solvent and at a temperature of between 80 and 200° C.

10. A method according to claim 8, wherein said anhydrous inert organic solvent is selected from the group consisting of pyridine, tetraline, and methyl naphthalene.

11. A method according to claim 8, wherein said saponification is carried out by means of a solution of alkali metal hydroxide.

12. The method of preparing 4-carboxyalkylmercapto-5-aryl pyrimidines of the general formula

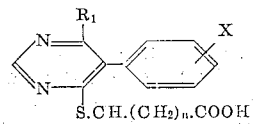

wherein $R_1$ and R each are selected from the group consisting of a hydrogen atom, straight alkyl with 1–4 carbon atoms and branched alkyl with 1–4 carbon atoms, X is selected from the group consisting of a hydrogen atom, a halogen atom, the amino group and the nitro group, and $n$ denotes an integral number from 0 to 5, comprising the steps of reacting a compound of the general formula

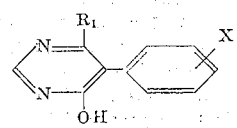

wherein $R_1$ and X have the same meaning as above, with phosphorus pentasulfide so as to form a compound of the general formula

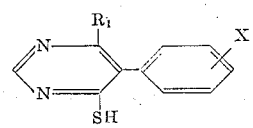

wherein $R_1$ and X have the same meaning as above; and reacting said last mentioned compound, in the medium of an aqueous or aqueous-alcoholic solution of an alkali metal hydroxide, with a substance selected from the group consisting of halogen-carboxylic acids of the general formula

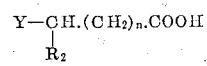

wherein $R_2$ is selected from the group consisting of a hydrogen atom, straight alkyl with 1–5 carbon atoms and branched alkyl with 1–5 carbon atoms and Y is a halogen and $n$ denotes an integral number from 0 to 5, and salts and esters thereof.

No references cited.

NICHOLAS S. RIZZO, *Primary Examiner.*